(12) United States Patent
Chen

(10) Patent No.: US 7,560,830 B2
(45) Date of Patent: Jul. 14, 2009

(54) INDIVIDUAL CONTROL CIRCUIT AND METHOD OF MULTIPLE POWER OUTPUT

(75) Inventor: Tsung-Chun Chen, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 331 days.

(21) Appl. No.: 11/581,374

(22) Filed: Oct. 17, 2006

(65) Prior Publication Data
US 2008/0091960 A1  Apr. 17, 2008

(51) Int. Cl.
*H02J 7/00* (2006.01)
(52) U.S. Cl. ..................................... 307/64
(58) Field of Classification Search .............. 307/64
See application file for complete search history.

(56) References Cited
U.S. PATENT DOCUMENTS
7,307,837 B2 * 12/2007 Merkin et al. .............. 361/685

2005/0076249 A1 * 4/2005 Kasprzak et al. ............ 713/300

* cited by examiner

Primary Examiner—Robert L. DeBeradinis
(74) Attorney, Agent, or Firm—Muncy, Geissler, Olds & Lowe, PLLC

(57) ABSTRACT

An individual control circuit and method of multiple power output to be used on a single server power supply system includes a circuit board to receive power from the single server power supply system, a plurality of power output units located on the circuit board each supplies power required by a power system and each has a power OFF mode and a power ON mode, and a control circuit located on the circuit board to drive the power output units to output power. The control circuit receives a duty signal from feedback of the power system to determine whether the power system is abnormal, and orders the power output unit which provides power at the front end of the abnormal power system to enter the power OFF mode.

17 Claims, 3 Drawing Sheets

INDIVIDUAL CONTROL CIRCUIT AND METHOD OF MULTIPLE POWER OUTPUT

FIELD OF THE INVENTION

The present invention relates to an individual control circuit and method of multiple power output and particularly to a control circuit used on a single server to flexibly output multiple power to a plurality of main boards without altering power supply structure.

BACKGROUND OF THE INVENTION

The servers on the market at present generally can be divided into blade servers and single servers to meet different users' requirements. Structure wise, a blade server has multiple power slots to supply power for multiple main boards. A single server has only one set of power transmission line to supply power for one main board.

To users of the single server, when there is a need to add only one or two main boards, due to space constraint of the power supply of the original single server the additional main boards cannot get required power from the power supply of the original single server. Hence a blade server has to be used to provide the required power for the additional main boards. This involves altering the server chassis, power supply, etc. Not only the cost increases, the original single server also becomes useless. The substituted blade server also has extra power slots that are not fully used and become waste.

SUMMARY OF THE INVENTION

Therefore the primary object of the present invention is to provide individual control of multiple power output for a single server that has a plurality of power output units to provide power required by power systems and a control circuit to determine abnormal conditions of the power systems to prevent damage of the power systems.

To achieve the aforesaid object, the present invention provides an individual control circuit of multiple power output to be used on a single server power supply system. It includes a circuit board to get power from the power supply system of a single server, a plurality of power output units located on the circuit board each provides required power for one power system and has a power OFF mode and a power ON mode, and a control circuit located on the circuit board to drive the power output units to output power that receives a feedback duty signal from the power system to determine whether the power system is abnormal and orders the power output units at the front end to enter the power OFF mode when the power system is abnormal.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
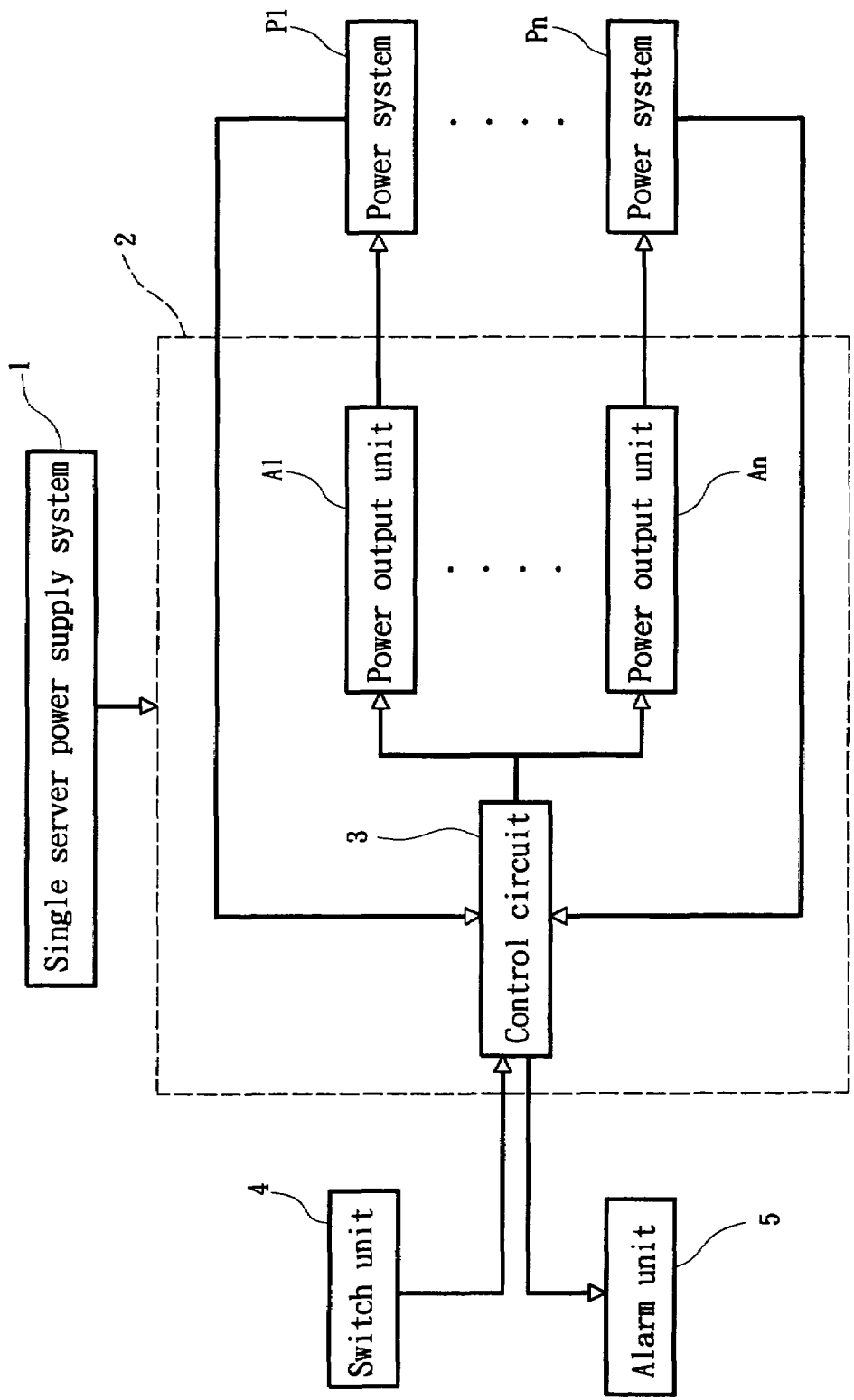
FIG. 1 is a circuit block diagram of an embodiment of the invention.
Figure 2:
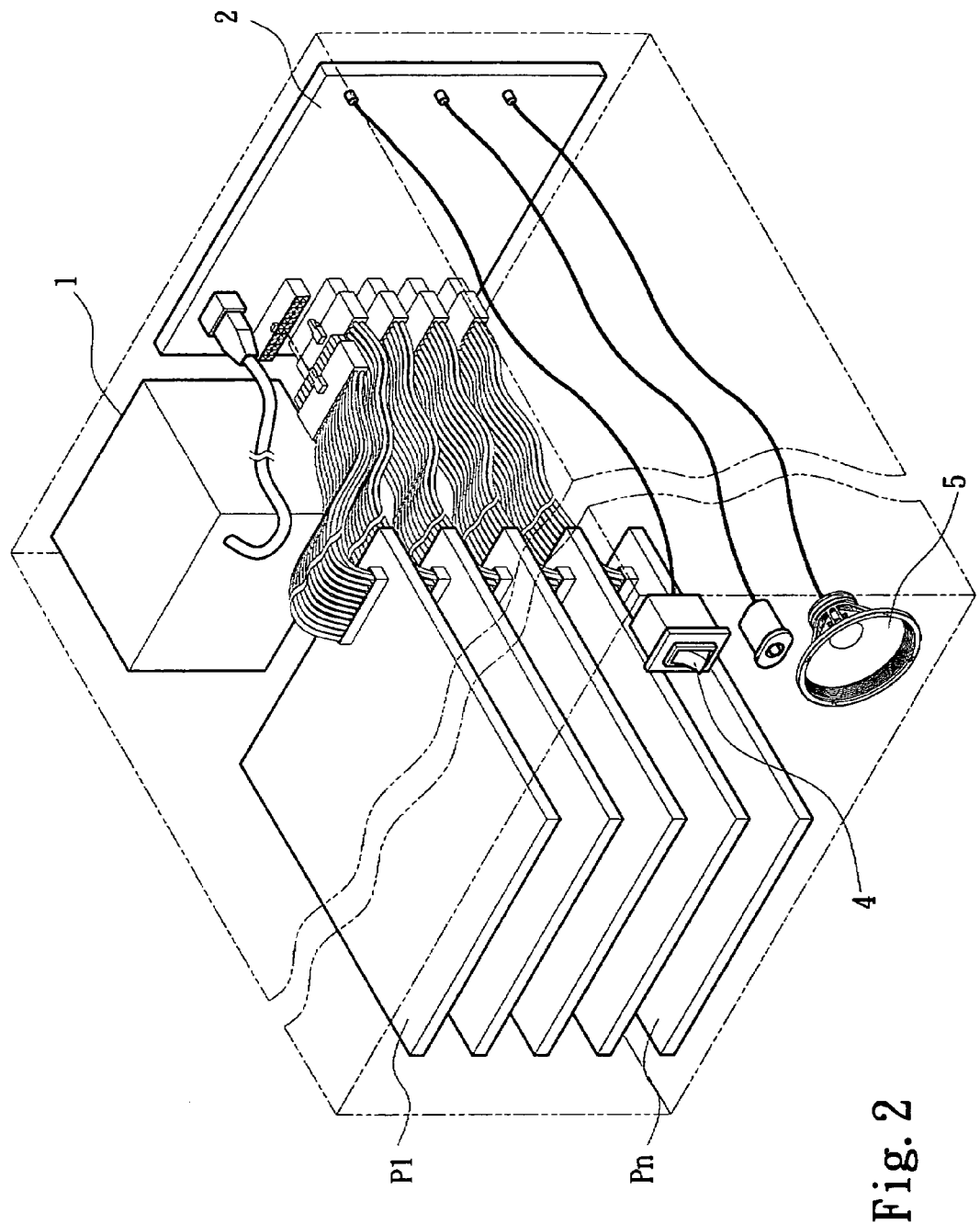
FIG. 2 is a schematic view of the hardware structure of an embodiment of the invention.
Figure 3:
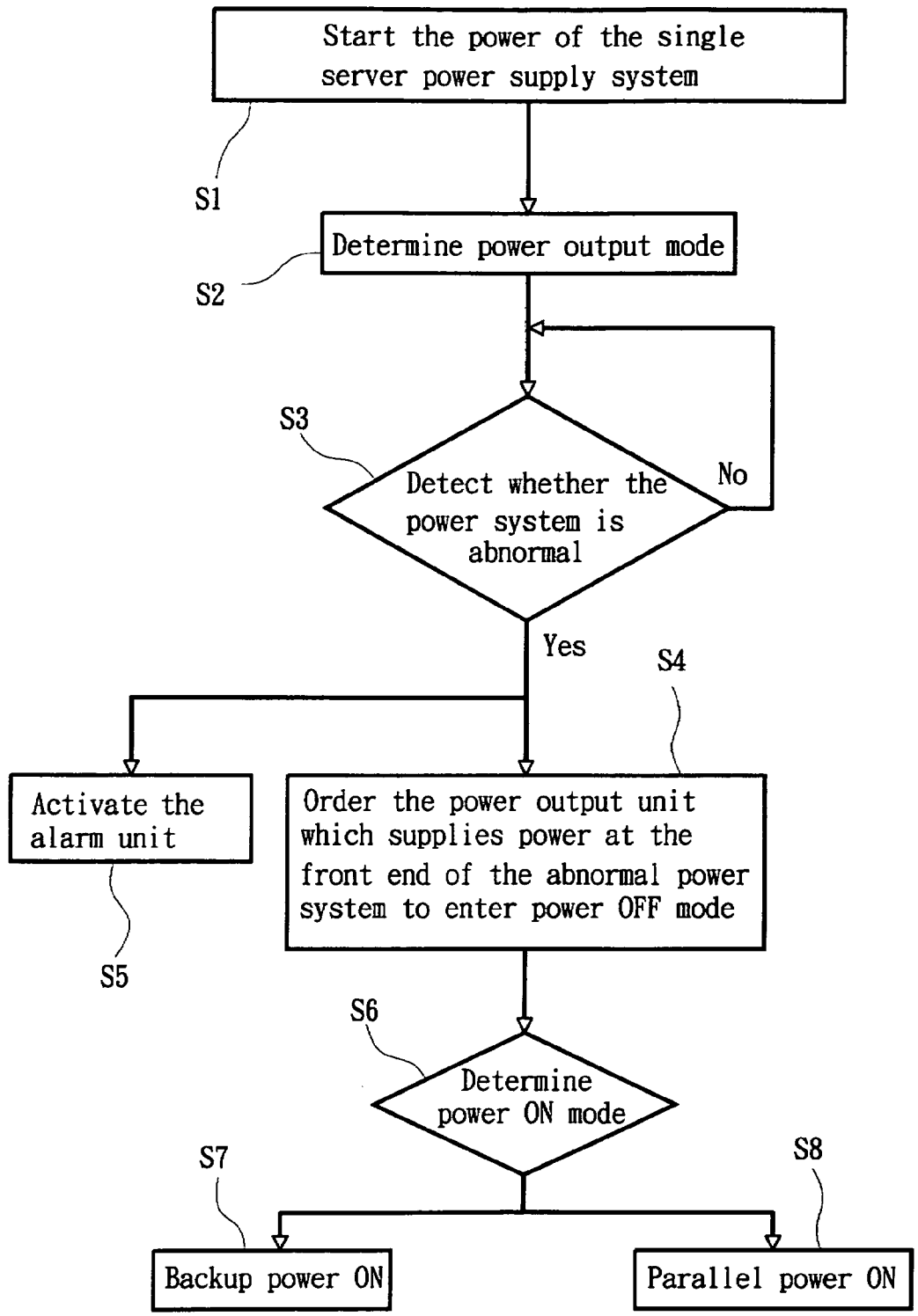
FIG. 3 is a flow chart of the method of an embodiment of the invention.

Please refer to FIGS. 1, 2 and 3 for an embodiment of the control circuit and method of the invention. It is to be used on a single server power supply system 1. It includes:

a circuit board 2 to get power from the single server power supply system 1;

a plurality of power output units A1-An located on the circuit board 2 each providing power required by a power system. The power output units A1-An have a power OFF mode and a power ON mode. In this embodiment power systems P1-Pn are main boards. The power output units A1-An are electrically connected to a connector of the main boards through power cords; and a control circuit 3 located on the circuit board 2 to drive the power output units A1-An to output power. The control circuit 3 receives a feedback duty signal from the power systems P1-Pn to determine whether the power systems P1-Pn are abnormal. In the event that the power systems P1-Pn are abnormal the power output units A1-An at the front end that provide the power are ordered to enter in the power OFF mode. The control circuit 3 may consist of a plurality of switches each corresponding to one of the power output units A1-An to control the power ON mode of the power output units A1-An.

In addition, the control circuit 3 is electrically connected to a switch unit 4 which has a first signal and a second signal, and an alarm unit 5 which generates an alarm signal when the control circuit 3 determines that any of the power systems P1-Pn is abnormal. In this embodiment the alarm unit 5 is a buzzer or an alarm light. The first signal of the switch unit 4 is input to the control circuit 3 to order the power output units A1-An to enter the power OFF mode. The second signal of the switch unit 4 is input to the control circuit 3 to order the power output units A1-An to enter the power ON mode.

It is to be noted that in this embodiment the switch unit 4 is a switch. In practice the switch unit 4 may also be located in the power system P1-Pn. The first or second signal (such as remote On/Off signals of the main board) is entered through the power systems P1-Pn to the control circuit 3 so that the power output units A1-An can be ordered to enter the power OFF mode or power ON mode.

Furthermore, the power ON mode of the power output units A1-An also includes a backup power ON mode and a parallel power ON mode that allow the power output units A1-An at the front end of the power systems P1-Pn that provide power to enter the parallel power ON mode when the control circuit 3 determines that any of the power systems P1-Pn is abnormal. The backup power ON mode and the parallel power ON mode of the power output units A1-An also can be cooperated with the first signal and the second signal of the switch unit 4 so that when the first signal is input to the control circuit 3 the power output units A1-An enter the backup power ON mode, and when the second signal is input to the control circuit 3 the power output units A1-An enter the parallel power ON mode.

The control method of the individual control circuit of the invention includes the following procedures:

start the power of the single server power supply system 1 (S1): connect (AC ON) the power of the single server power supply system 1 and the control circuit 3 of the circuit board 2; the control circuit 3 is activated but the power output units A1-An are not yet activated;

determine power output mode (S2): before the control circuit 3 activates the power output units A1-An to output power, first detect the rear end loading value of each of the power output units A1-An; if the loading value is within a selected range, order the power output units A1-An to enter the power OFF mode; if the loading value exceeds the selected range, order the power output units A1-An to enter the power ON mode; and detect whether the power systems P1-Pn are abnormal (S3): the control circuit 3 outputs a driving signal to actuate the power output units A1-An that have the power ON mode to output power to the power systems P1-Pn, and the power systems P1-Pn feedback a duty signal to the control circuit 3 which determines whether the power systems P1-Pn are abnormal. If negative, repeat the detection process; if positive, the power output units A1-An at the front end of the abnormal power systems P1-Pn are ordered to enter the power OFF mode (S4). For instance, if the control circuit 3 determines that the power system P1 is abnormal, the power output unit A1 at the front end thereof enters the power OFF mode.

Moreover, in the condition in which the control circuit 3 is electrically connected to the alarm unit 5, the previous step of detect whether the power systems P1-Pn are abnormal (S3) is followed by a step of activating the alarm unit 5 (S5). In such an occasion if the control circuit 3 determines through the duty signal that an abnormal condition occurs to any of the power systems P1-Pn, the alarm unit 5 which is electrically connected to the control circuit 3 generates an alarm signal. For instance, if the control circuit 3 determines that the power system P1 is abnormal, the alarm unit 5 generates a signal indicating the power system P1 being abnormal so that users can immediately inspect or replace the power system P1.

In addition, if the power ON mode of the power output units A1-An includes the backup power ON mode and the parallel power ON mode, the previous step of detect whether the power systems P1-Pn are abnormal (S3) is followed by a step of determining the power ON mode (S6). This is accomplished through the first signal and the second signal of the switch unit 4 or one of the preset backup power ON mode and parallel power ON mode. A backup power ON mode (S7) and a parallel power ON mode (S8) are provided.

In the backup power ON mode (S7), the control circuit 3 determines whether any of the power systems P1-Pn is abnormal through the duty signal so that the power output units A1-An at the front end of the normal power systems are ordered to enter the backup power ON mode. For instance, if the control circuit 3 determines that the power system P1 is abnormal, aside from the power output unit Al at the front end to provide power enters the power OFF mode, the normal power output units A2-An to provide power at the front end of the power systems P2-Pn are ordered to enter the backup power ON mode.

In the parallel power ON mode (S8), the control circuit 3 determines whether any of the power systems P1-Pn is abnormal through the duty signal so that the power output units A1-An at the front end of the power systems are ordered to enter the parallel power ON mode. For instance, if the control circuit 3 determines that the power system P1 is abnormal, aside from the power output unit A1 at the front end to provide power enters the power OFF mode, the normal power output units A2-An to provide power at the front end of the power systems P2-Pn are ordered to enter the parallel power ON mode.

In short, the invention provides a plurality of power output units A1-An to supply power required by the power systems P1-Pn. Thus there is no need to alter the single server structure to provide power required by multiple main boards. Moreover, the control circuit 3 can prevent power damage that might otherwise occur caused by abnormal conditions of the power systems P1-Pn. It offers a significant improvement over the conventional techniques.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An individual control circuit of multiple power output for single server power supply systems, comprising:
   a circuit board to receive power from a single server power supply system;
   a plurality of power output units located on the circuit board each providing power required by a power system and having a power OFF mode and a power ON mode; and
   a control circuit which is located on the circuit board to drive the power output units to output power and receive a duty signal from feedback of the power system to determine whether the power system is abnormal, and order the power output unit which provides power at a front end of the power system to enter the power OFF mode when the power system is being determined abnormal.

2. The individual control circuit of multiple power output of claim 1, wherein the power output units are electrically connected to a connector through power cords.

3. The individual control circuit of multiple power output of claim 1, wherein the power system is a main board.

4. The individual control circuit of multiple power output of claim 1, wherein the control circuit is electrically connected to an alarm unit which generates an alarm signal when the control circuit determines any of the power systems is abnormal.

5. The individual control circuit of multiple power output of claim 1, wherein the control circuit is electrically connected to a switch unit which has a first signal and a second signal, the switch unit transmitting the first signal to order the power output unit to enter the power OFF mode and transmitting the second signal to order the power output unit to enter the power ON mode.

6. The individual control circuit of multiple power output of claim 5, wherein the switch unit is located in the power system to send the first signal or the second signal to the control circuit through the power system to order the power output unit to enter the power OFF mode or the power ON mode.

7. The individual control circuit of multiple power output of claim 1, wherein the power ON mode of the power output unit includes a backup power ON mode and a parallel power ON mode.

8. The individual control circuit of multiple power output of claim 7, wherein the control circuit is electrically connected to a switch unit which has a first signal and a second signal, the switch unit transmitting the first signal to order the power output unit to enter the backup power ON mode and transmitting the second signal to order the power output unit to enter the parallel power ON mode.

9. The individual control circuit of multiple power output of claim 7, wherein the control circuit orders the power output units which provide power at the front end of the power systems to enter the parallel power ON mode when it determines that any of the power systems is abnormal.

10. The individual control circuit of multiple power output of claim 7, wherein the control circuit orders the power output units which provide power at the front end of the power systems to enter the backup power ON mode when it determines that any of the power systems is abnormal.

11. A control method for an individual control circuit of multiple power output to be used on a single sever power supply system which has a circuit board to integrate a plurality of power output units, each of the power output units supplying power required by a power system, the circuit board having a control circuit to drive the power output units to output power, the control method comprising the steps of:
   starting the power of the single server power supply system;
   determining power output mode before the control circuit drives the power output units to output power in which the control circuit first detects whether a loading value at a rear end of each power output unit is within a selected range and orders the power output unit to enter a power OFF mode when the loading value is within the selected range, and orders the power output unit to enter a power ON mode when the loading value exceeds the selected range; and
   detecting abnormal conditions of the power system by the control circuit after the control circuit has output a driving signal to drive the power output unit in the power ON mode to output power to the power system which sends a feedback duty signal to the control circuit to determine the abnormal conditions; repeating the detecting when the abnormal conditions are absent and ordering the power output unit which provides power at a front end of the power system to enter the power OFF mode when the abnormal conditions exist.

12. The control method of claim 11, wherein the step of detecting abnormal conditions of the power system is followed by activating an alarm unit which is electrically connected to the control circuit to generate an alarm signal when the abnormal conditions exist on any power system.

13. The control method of claim 11, wherein the power ON mode of the power output unit includes a backup power ON mode and a parallel power ON mode.

14. The control method of claim 13, wherein the step of detecting abnormal conditions of the power system is followed by a step of determining whether the power ON mode of the power output unit is the backup power ON mode or the parallel power ON mode.

15. The control method of claim 14, wherein the step of determining the power ON mode is followed by a backup power ON step in which the control circuit determines the abnormal conditions of any power system through the duty signal and orders the power output units which provide power at the front end of normal power systems to enter the backup power ON mode.

16. The control method of claim 14, wherein the step of determining the power ON mode is followed by a parallel power ON step in which the control circuit determines the abnormal conditions of any power system through the duty signal and orders the power output units which provide power at the front end of normal power systems to enter the parallel power ON mode.

17. A power supply system, comprising:
   a single server power supply system having multiple power outputs; and
   an individual control circuit , including:
   a circuit board to receive power from the single server power supply system;
   a plurality of power output units located on the circuit board each providing power required by a power system and having a power OFF mode and a power ON mode; and
   a control circuit which is located on the circuit board to drive the power output units to output power and receive a duty signal from feedback of the power system to determine whether the power system is abnormal, and order the power output unit which provides power at a front end of the power system to enter the power OFF mode when the power system is being determined abnormal.

* * * * *